May 29, 1956  C. A. BRUERE  2,747,439
VISE DRILL PRESS
Filed Aug. 29, 1952
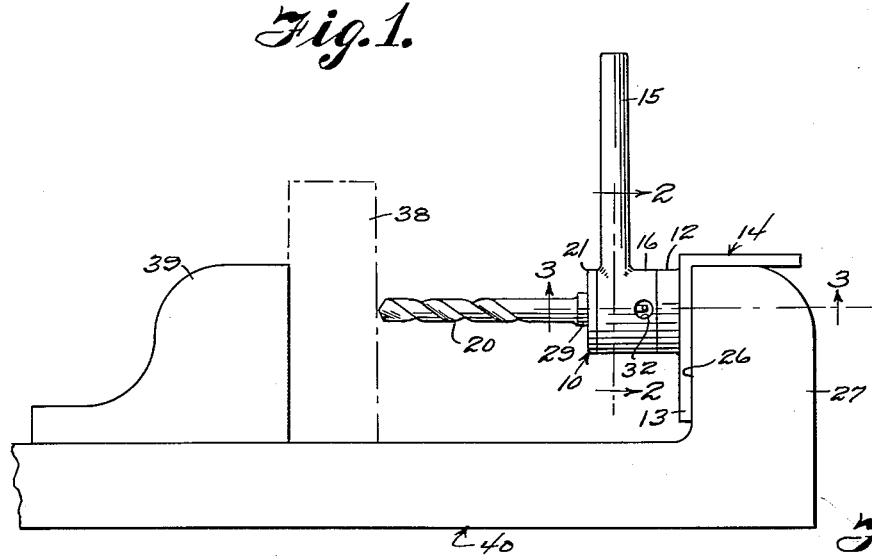
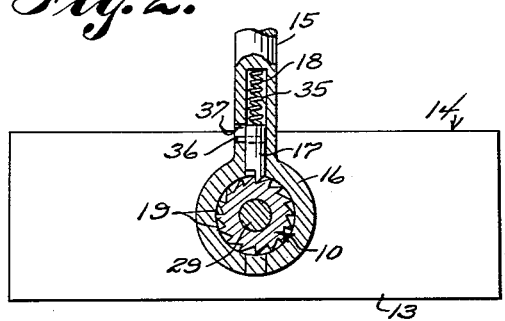
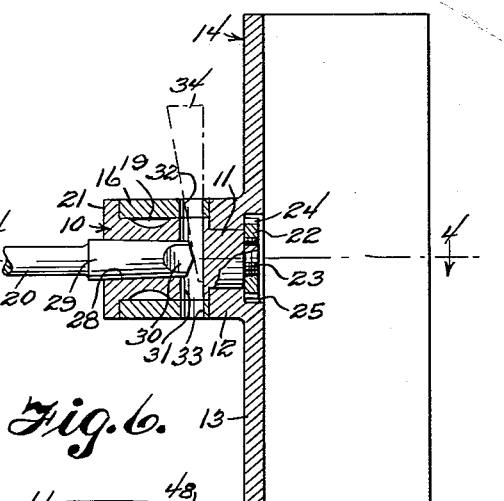
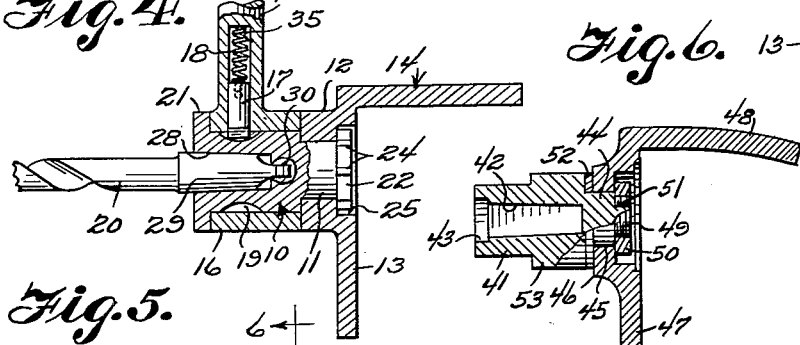
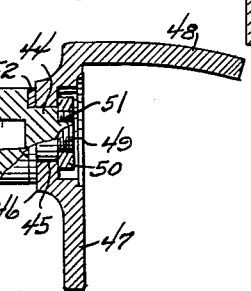
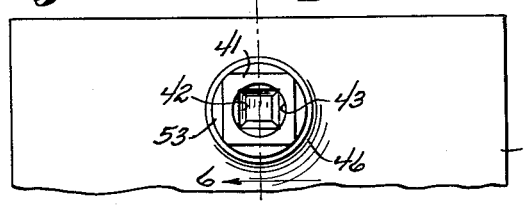
INVENTOR.
Charles A. Bruere
BY Victor J. Evans & Co.
ATTORNEYS

United States Patent Office 2,747,439
Patented May 29, 1956

2,747,439
VISE DRILL PRESS

Charles A. Bruere, Sheridan, Wyo.

Application August 29, 1952, Serial No. 307,096

6 Claims. (Cl. 77—44)

This invention relates to small manually actuated drill presses wherein a drill is rotated by a crank through a ratchet, and in particular a drill press adapted to be positioned on the jaw of a vise wherein with a plate or other object positioned against the opposite jaw of the vise the drill may be rotated by hand to drill a hole in a plate or object.

The purpose of this invention is to provide means for applying pressure to a manually actuated drill press whereby a drill rotated in the drill press is adapted to bore a hole through material fed toward the drill press.

In the conventional type of manually actuated drill press where a drill is held in a brace or gear actuated tool it is difficult to apply sufficient pressure to the bit of the drill to force the drill through a plate of metal or the like.

With this thought in mind this invention contemplates a base, L-shape in cross section having a spindle with a drill holding chuck in the outer end rotatably mounted therein and having a handle or crank with a ratchet therein positioned on the spindle whereby the drill is rotated upon turning the spindle with the crank.

The object of this invention is, therefore, to provide means for forming a drill mounting so that with the mounting positioned on one jaw of a vise the drill is adapted to be manually actuated to bore a hole through a piece of material positioned against the opposite jaw of the vise.

Another object of the invention is to provide a manually actuated drill press that is adapted to be mounted on the jaw of a vise without permanently attaching the device to the jaw.

A further object of the invention is to provide a manually actuated drill press for use in a vise in which the drill press is of a simple and economical construction.

With these and other objects and advantages in view the invention embodies a base L-shape in cross section having a boss extended from one side, a spindle having a drill retaining socket in the outer end and a row of teeth in the periphery journaled in the boss of the base and a handle having a hub journaled on the spindle and having a spring actuated pawl therein, the pawl being positioned to coact with the teeth in the periphery of the spindle whereby the spindle may be rotated by the crank.

Other features and advantages of the invention will appear from the following description taken in connection with the drawing wherein:

Figure 1 is a side elevational view illustrating the drill press of this invention mounted on the jaw of a vise and showing a member in dot and dash lines positioned to be drilled by a drill in the drill press.

Figure 2 is a vertical section taken on line 2—2 of Fig. 1 through the latch mechanism incorporated in the crank and spindle of the drill press.

Figure 3 is a longitudinal section taken on line 3—3 of Fig. 1 looking upwardly and illustrating an opening through the hub of the crank and spindle whereby a tool may be inserted in the device for removing a drill in the spindle thereof.

Figure 4 is a similar section taken on line 4—4 of Fig. 3.

Figure 5 is a front elevational view showing a modification wherein the device is provided with a socket having flat sides.

Figure 6 is a section taken on line 6—6 of Figure 5.

Referring now to the drawing wherein like reference characters denote corresponding parts the manually actuated vice drill press of this invention includes a spindle 10 journaled by a section 11 of reduced diameter in a boss 12 of a leg 13 of a base 14, and a crank or handle 15 having a hub 16 by which it is journaled on the spindle 10 and also having a pawl 17 that is urged by a spring 18 into engagement with teeth 19 in the surface of the spindle whereby with the crank actuated in a counter-clockwise direction from the position shown in Fig. 2 the spindle with a drill mounted therein, as indicated by the numeral 20 is rotated.

The outer end of the spindle is provided with a flange 21 by which the crank is retained in position on the spindle and the opposite end thereof is provided with a nut 22 that is threaded on a stud 23 extended from the section 11 of the spindle and thereby, providing means for rotatably mounting the spindle in the boss 12 of the base. The peripheral surface of the nut 22 is provided with slots or serrations 24 to facilitate rotating the nut and, as illustrated in Fig. 3 the nut is positioned in a recess 25 in the inner surface of the leg 13 of the base whereby the leg is adapted to be positioned against a surface 26 of a jaw 27 with the horizontally disposed part of the base 14 positioned on the upper end of the jaw.

The spindle 10 is provided with a socket 28 in which a tapering shank 29 of a drill 20 is positioned when it is desired to use the device and, as illustrated in Fig. 3, a projection 30 on the end of the shank 29 extends into an opening 31 which extends through the spindle and which is positioned to register with openings 32 and 33 in the hub 16 whereby a tool, as indicated by the numeral 34 may be inserted through one of the openings in the hub with said openings in registering relation with the opening 31 of the spindle so that the tool may engage the end 3 of the shank of the drill to dislodge the drill from th socket 28 in the end of the spindle.

The crank or handle 15 is provided with a bore 35 which the pawl 17 is slidably mounted and, as illustrat in Fig. 2, the pawl is urged toward the ratchet teeth by the spring 18 and is held in position by a pin 36 po tioned in the pawl and extended into a slot 37 in one s of the crank 15.

With the parts arranged in this manner the drill pr of this invention is positioned on a jaw, such as the 27 of a vise and with a drill in the socket in the enc the spindle a hole may be drilled in a plate or other p of work as indicated by the dot and dash lines 38 and work may be fed toward the drill by the jaw 39 of the which is indicated by the numeral 40.

Spindles having sockets of different sizes may be vided, however, in drills of this type the same size s is used for drills of different sizes.

In the design shown in Figures 5 and 6 a spind similar to the spindle 10 is provided with a square s 42 having a similarly shaped recess 43 around the end. The opposite end of the spindle is provided stub shaft 44 by which the spindle is journaled in a ing 45 of a boss 46 on a vertical leg or plate 47 L-shaped bracket having an upper horizontally di arcuate leg or plate 48. The stub shaft 44 is pr with a threaded stud 49 on which a nut 50 is th The nut 50 is positioned in a recess 51 and the stu is provided with a washer 52.

The outer surface of a base 53 of the spindle is provided with flat sides whereby the spindle may be rotated with a wrench or the like.

The spindles of this tool may, therefore, be provided with sockets for round shank drills, or with sockets for wood bits, or for bits or sockets of different types and designs.

It will be understood that modifications may be made in the design and arrangement of the parts without departing from the spirit of the invention.

What is claimed is:

1. A drill press comprising an L-shaped base having a short arm and a long arm, a spindle journaled in the long arm of said base and extending inwardly of the long arm of the base below a plane passing through the short arm of the base, said spindle having a drill holding socket in one end and a row of ratchet teeth in the peripheral surface, a handle journaled on said spindle and a ratchet in said handle and positioned to coact with the ratchet teeth of the spindle for rotating the spindle and a drill therein by the handle.

2. A drill press comprising a base, a spindle extended from the base, said base being L-shape in cross section having a long leg and a short leg and having a boss in which the spindle is journaled extended from the long leg thereof below a plane passing through the short leg of the base, said spindle having a drill holding socket in one end and a row of ratchet teeth in the peripheral surface, a handle journaled on said spindle, and a ratchet in said handle and positioned to coact with the ratchet teeth of the spindle for rotating the spindle and a drill therein by the handle.

3. A drill press comprising a base, a spindle extended from the base, said base being L-shape in cross section having a long leg and a short leg and having a boss in which the spindle is journaled extended from the long leg thereof below a plane passing through the short leg of the base, said spindle having a drill holding socket in one end and a row of ratchet teeth in the peripheral surface, a handle journaled on said spindle, and a ratchet in said handle and position to coact with the ratchet teeth of the spindle for rotating the spindle and a drill therein by the handle, said handle having a hub through which it is journaled on the spindle, and said hub and spindle having openings therethrough that are positioned to register for receiving a tool for dislodging a drill in the socket of the spindle.

4. In a drill press, the combination which comprises a base, L-shaped in cross section having a horizontal and vertical leg and said vertical leg having a boss with a bore therethrough on one side, a spindle having a flange, on an extended end, a threaded stud on the opposite end, and ratchet teeth in the peripheral surface journaled in the bore of the boss on the vertical leg of the base below the plane of the horizontal leg of the base and extending inwardly of the vertical leg of the base, a nut threaded on the stud of the spindle for retaining the spindle in the boss of the base, a hub journaled on the spindle and having a crank extended therefrom, a pawl carried by the crank, extended through the hub, and positioned to engage the ratchet teeth of the spindle whereby rotation of the crank in one direction rotates the spindle, and a spring positioned to urge the pawl into engagement with the teeth of the spindle, said spindle having a tool holding socket in the end on which the annular flange is positioned.

5. In a boring tool, the combination which comprises a base L-shaped in cross section having a horizontally disposed leg and a vertical leg, said vertical leg having a bore therethrough, and a spindle having a drill bit retaining socket extended inwardly from one end journaled in the bore of the vertically disposed leg and extending below the plane of the horizontal leg in the opposite direction to the extension of the horizontal leg and having flat wrench gripping surfaces on the outer surface.

6. In a boring tool, the combination which comprises a base L-shaped in cross section having a horizontally disposed leg and a vertical leg, said vertical leg having a bore therethrough, a spindle having a drill bit retaining socket extended inwardly from one end journaled in the bore of the vertically disposed leg and extending inwardly of the vertical leg below the plane of the horizontal leg of the base and having flat wrench gripping surfaces on the outer surface and means retaining said spindle in said bore of the vertically disposed leg of the base.

References Cited in the file of this patent

UNITED STATES PATENTS

| Re. 9,944 | Ware et al. | Nov. 22, 1881 |
|---|---|---|
| 81,145 | Cornell | Aug. 18, 1868 |
| 243,544 | Fisher | June 28, 1881 |
| 270,516 | Turner | Jan. 9, 1883 |
| 303,647 | King | Aug. 19, 1884 |
| 328,550 | Vosburgh | Oct. 20, 1885 |
| 509,938 | Olm | Dec. 5, 1893 |
| 1,337,205 | Dingman | Apr. 20, 1920 |
| 2,416,912 | Curtis | Mar. 4, 1947 |

FOREIGN PATENTS

| 3,537 | Great Britain | Sept. 6, 1878 |